(12) United States Patent
Scibilia

(10) Patent No.: US 9,203,318 B2
(45) Date of Patent: Dec. 1, 2015

(54) PRIMARY SIDE CURRENT REGULATION ON LLC CONVERTERS FOR LED DRIVING

(71) Applicant: Texas Instruments Deutschland GmbH, Freising (DE)

(72) Inventor: Roberto Scibilia, Freising (DE)

(73) Assignee: Texas Instruments Deutschland GmbH, Freising (DE)

( * ) Notice: Subject to any disclaimer, the term of this patent is extended or adjusted under 35 U.S.C. 154(b) by 78 days.

(21) Appl. No.: 14/133,044

(22) Filed: Dec. 18, 2013

(65) Prior Publication Data

US 2015/0171754 A1 Jun. 18, 2015

(51) Int. Cl.
*H02M 3/335* (2006.01)
*H05B 33/08* (2006.01)

(52) U.S. Cl.
CPC ....... *H02M 3/33507* (2013.01); *H05B 33/0815* (2013.01)

(58) Field of Classification Search
CPC ............. H02M 2007/4815; H02M 2007/4818; H02M 2007/4822; Y02B 70/1433; Y02B 70/1416
USPC .......................... 363/16, 17, 21.02, 21.03, 97
See application file for complete search history.

(56) References Cited

U.S. PATENT DOCUMENTS

| 5,699,238 A | * | 12/1997 | Lee et al. ................... 363/21.03 |
| 5,767,744 A | * | 6/1998 | Irwin et al. .................... 330/297 |
| 5,796,216 A | * | 8/1998 | Beasley ......................... 315/307 |
| 6,351,401 B1 | * | 2/2002 | Scheel et al. .................... 363/98 |

OTHER PUBLICATIONS

Datasheet "TPS92020: Resonant-Switching Driver Controller for LED Lighting," Texas Instruments Incorporated, Jul. 2010.

* cited by examiner

*Primary Examiner* — Gary L Laxton
(74) *Attorney, Agent, or Firm* — William B. Kempler; Frank D. Cimino

(57) ABSTRACT

An LLC converter having a bridge circuit coupled to an input voltage at least one pair of power switches, a resonant network, coupled to the bridge circuit and driven by power switches, an output transformer coupled to the resonant network having first and second primary side windings and a secondary side winding, a current sense transformer on the primary side in series to the resonant network and the first primary winding, an integrator circuit coupled in parallel to the second primary side winding and in parallel to the secondary side winding of the current sense transformer the transformer providing an output current of the LLC series resonant converter and a frequency adjustment controller coupled to at least one pair of power switches and the current sense transformer and the integrator circuit providing driving signals to the at least one pair power switches.

17 Claims, 4 Drawing Sheets

PRIMARY SIDE CURRENT REGULATION ON LLC CONVERTERS FOR LED DRIVING

FIELD OF THE INVENTION

This disclosure relates to the improving of successful operation of inductor capacitor converters ("LLC converters") and in particular to increasing the reliability and reducing the costs of production of LLC converters. More specifically, the examples of the present disclosure relate to controlling the output of a LLC converter by using a current sense transformer on the primary side of the transformer of a LLC converter.

BACKGROUND

One type of power converter that has been of increasing interest is the inductor capacitor converter ("LLC converter"). In standard LLC converters the primary side current is the sum of the reflected secondary side current (divided by the turn ratio) and the magnetizing current.

FIG. 1 is a prior art circuit configuration of a common LLC converter 1 having a half-bridge structure. The LLC converter 1 represents a circuit composed by two inductors and a capacitor. A half-bridge circuit 3 is formed by a pair of power switches 5 and 7 for driving a resonant network 9. The LLC has three resonant parameters. A first resonant parameter is a series resonant inductor Lr, a second parameter is a series resonant capacitor Cr and a third resonant parameter is a magnetizing inductor Lm of a transformer 11.

The input terminal 13 of the LLC converter is a DC voltage. The transformer 11 isolates the half-bridge circuit 3 and the resonant network 9 from a rectification circuit 15 by a primary side winding 17 and two series secondary sides winding 19, 21. The two series secondary sides winding 19, 21 are coupled in series.

The rectification circuit 15 includes a pair of rectification diodes 23 and 25. The diodes 23 and 25 are connected to an output capacitor 27. The cathodes of the diodes 23, 25 are connected to the positive terminal of capacitor 27. The anode of diode 23 is connected to the positive terminal of the secondary side coil 19, and the anode of diode 25 is connected to the negative terminal of the secondary side coil 21. A common connection node between the coils 19, 21 is ground of an output voltage.

The power switches 5, 7 of the LLC converter 1 operate under the condition of equal pulse width, in general in the condition of 50%, minus a delay time. An adjustment of the output voltage is obtained by changing the operation frequency of the power switches 5, 7.

To provide proper driving signals for a LLC converter to stabilize the output current a current sense transformer can be used according to the state of the art. The current sense transformer is connected anti-parallel to the secondary side coils. One of the disadvantages of such a current sense transformer is that such current sense transformers are expensive, since they have to withstand a high isolation voltage of e.g. 4 kV. Furthermore, an additional overvoltage protection is needed on the output side because the LLC converter is current controlled only with the help of the current sense transformer. Such an overvoltage protection can for example be provided by an optocoupler and a zener diode, or a crowbar system. In combination with the current sense transformer, the use of an optocoupler and a zener diode makes the overall system quite expensive.

Therefore, better technique is demanded to solve the above problems to provide proper driving signals for LLC converters. A general object of the present disclosure is therefore to provide an alternative for providing proper driving signals for LLC converters that allows a cheaper sensing of the secondary side current and the secondary side voltage.

SUMMARY

One aspect of the present disclosure is a LLC converter. The LLC converter may have according to one example of the present disclosure a bridge circuit, coupled to an input voltage, and at least one pair of power switches. A resonant network may be coupled to the bridge circuit and may be driven by the at least one pair of power switches. Furthermore, the LLC converter may have a transformer, coupled to the resonant network, wherein the transformer may comprise a first and a second primary side winding and at least one secondary side winding. Moreover, the LLC converter may comprise a current sense transformer, coupled on the primary side in series to the resonant network and the first primary winding of the transformer as well as an integrator circuit that may be coupled in parallel to the second primary side winding of the transformer and in parallel to the secondary side winding of the current sense transformer providing an integration of the voltage of the second primary side (or "auxiliary winding") 272 shown on FIG. 3 winding of the transformer. A rectification circuit may be coupled to the secondary side winding of the transformer. The transformer may provide an output current of the LLC series resonant converter. A frequency adjustment controller may be coupled between the at least one pair of power switches and the current sense transformer and the integrator circuit providing driving signals to the at least one pair power switches.

The terms positive and negative terminal and primary and secondary side of the transformer respectively the current sense transformer should be understood exemplarily to ease the understanding of the present disclosure. Of course, the positive terminal can be a negative terminal and the primary side can be a secondary side of a transformer and vice versa.

One of the surprising findings of the present disclosure is that the output of a LLC converter may be controlled using a current sense transformer on the primary side of transformer instead of a current sense transformer on the secondary side according to the state of the art.

One of the disadvantages of such a direct measurement of the current of a LLC converter on the primary side is that the magnetizing current of the magnetizing inductor of the transformer has to be compensated to calculate the secondary side current of the transformer. The magnetizing current of the transformer itself thereby may have a triangular waveform due to applying a square wave to the transformer.

Said magnetizing current may be compensated according to the present disclosure by synthesizing the magnetizing current by the help of the integrator. The integrator itself may thereby act as a low pass filter. As the integrator may be coupled in parallel to the auxiliary winding of the transformer the peak value and the slope of the synthesized triangular waveform may be dependent from the transformer voltage and the switching frequency in the same manner as the magnetizing current itself. By coupling the integrator to the secondary side of the current sense transformer the synthesized magnetizing current may be subtracted and thereby the dependency of the primary current of the transformer from the magnetizing current can be eliminated or reduced. To subtract the synthesized magnetizing current from the current on the secondary side of the current sense transformer it may be of advantage to couple the positive terminal of the secondary winding of the primary side of the transformer with the negative terminal of the secondary winding of the current sense transformer and the negative terminal of the secondary winding of the primary side of the transformer with the positive terminal of the secondary winding of the current sense transformer.

According to an aspect of the present disclosure, the integrator circuit may comprise at least four resistors and a first capacitor. A first resistor and a third resistor may be connected in series, wherein the first resistor may be connected to a positive terminal of the second primary side winding of the transformer. A second resistor and a fourth resistor may be connected in series, wherein the second resistor may be connected to a negative terminal of the auxiliary winding the transformer. A first side of the first capacitor may be connected between the first and the third resistor and a second side of the first capacitor may be connected between the second and the fourth resistor in parallel to the second winding of the transformer. The third resistor may be connected to a negative terminal of the secondary side winding of the current sense transformer and the fourth resistor may be connected to a positive terminal of the secondary side winding of the current sense transformer.

According to a further aspect of the present disclosure, the first or second power switch is a metal-oxide-semiconductor field-effect transistor (MOSFET).

According to an aspect of the present disclosure, the rectification may comprise at least two rectification diodes. According to an aspect of the present disclosure, the at least two rectification diodes may be connected to the anode of an output capacitor and the cathode of the output capacitor may be connected to ground.

According to an aspect of the present disclosure, the anode of the first rectification diode may be connected to the positive terminal of the secondary side winding of the transformer, and the anode of second rectification diode may be connected to the negative terminal of the secondary side winding of the transformer.

The rectification circuit may in the alternative be provided in form of a full wave rectifier connected to a single secondary side winding of the transformer. Therefore the anodes of a first and a second rectification diodes may be connected to ground and the cathode of the first rectification diode may be connected to the positive terminal of the secondary winding of the transformer and the cathode of the second rectification diode may be connected to the negative terminal of the secondary winding of the transformer, and the anode of a third rectification diode may be connected to the positive terminal of the secondary winding of the transformer and the anode of a fourth rectification diode may be connected to the negative terminal of the secondary winding of the transformer, and the cathodes of the third and fourth second rectification diode may be connected to the anode of an output capacitor and the cathode of the output capacitor is connected to ground or to a resistor.

According to another aspect of the present disclosure, at least one inductor may be coupled between the bridge circuit and the transformer. According to a further example, an anode of a first bias diode is connected to the positive terminal of the second primary winding of the transformer and an anode of a second bias diode is connected to the negative terminal of the second primary winding of the transformer and the cathodes of the first and the second bias diode are connected to a common connection point. Furthermore, according to one example the common connection point is connected to an input of the frequency adjustment controller.

According to this aspect, the series resonance inductor may not be integrated into the transformer. The second primary winding of the transformer therefore copies the output voltage of the secondary winding scaled by the turn ratio. The voltage at the common connection point therefore may be proportional to the output voltage. There are controllers known in the state of the art, e.g. TPS92020 from Texas Instruments, that have an internally overvoltage protection that switches the gate signals of the power switches of if the bias voltage at the common connection point is too high. Of course, it is obvious for those skilled in the art that other types of overvoltage protection can be used based on the bias voltage of the common connection point.

According to the present disclosure, with the help of the external inductor that may be coupled in series between the resonant network and the transformer as well as the voltage that may be provided at the first common connection point, no zener diode and optocoupler is needed for providing an overvoltage protection.

According to an aspect of the present disclosure, the anode of a first current sense diode may be connected to the positive terminal of the secondary side winding of the current sense transformer, and the anode of second current sense diode may be connected to the negative terminal of the secondary side winding of the current sense transformer. The cathodes of the first and the second current sense diodes may be connected to a second common connection point. The second common connection point may be connected to a second input of the frequency adjustment controller.

According to an aspect of the present disclosure, a low-pass filter may be connected between the second common connection point and the second input of the frequency adjustment controller. The low-pass filter may comprise a fifth resistor coupled between the second connection point and ground, a sixth resistor coupled between the second common connection point and the second input of the frequency adjustment controller and a second capacitor. A first side of the second capacitor may be coupled between the second input of the frequency adjustment controller and sixth resistance and the second side of the second capacitor may be connected to ground.

With the help of the low-pass filter the current measured by the current sense transformer can be extracted to be proportional to the current on the secondary side of the transformer.

According to a further aspect of the present disclosure, a comparator may be connected to the sixth resistor and to a third input of the frequency adjustment controller, wherein the comparator may be configured to compare the voltage proportional to the current on the secondary side of the controller with a reference voltage.

The comparator may be an error amplifier and compares the voltage proportional to the current on the secondary side of the controller with a reference voltage. The resulting error signal may be used by the frequency adjustment controller to modulate the switching frequency of the power switches.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative examples are illustrated and described below, it will be appreciated that various changes can be made therein without departing from the spirit and scope of the disclosure. In that regard, the detailed description set forth below, in connection with the appended drawings is intended only as a description of various examples of the disclosed subject matter and is not intended to represent the only examples. Each example described in this disclosure is provided merely as an example or illustration. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

Figure 1:
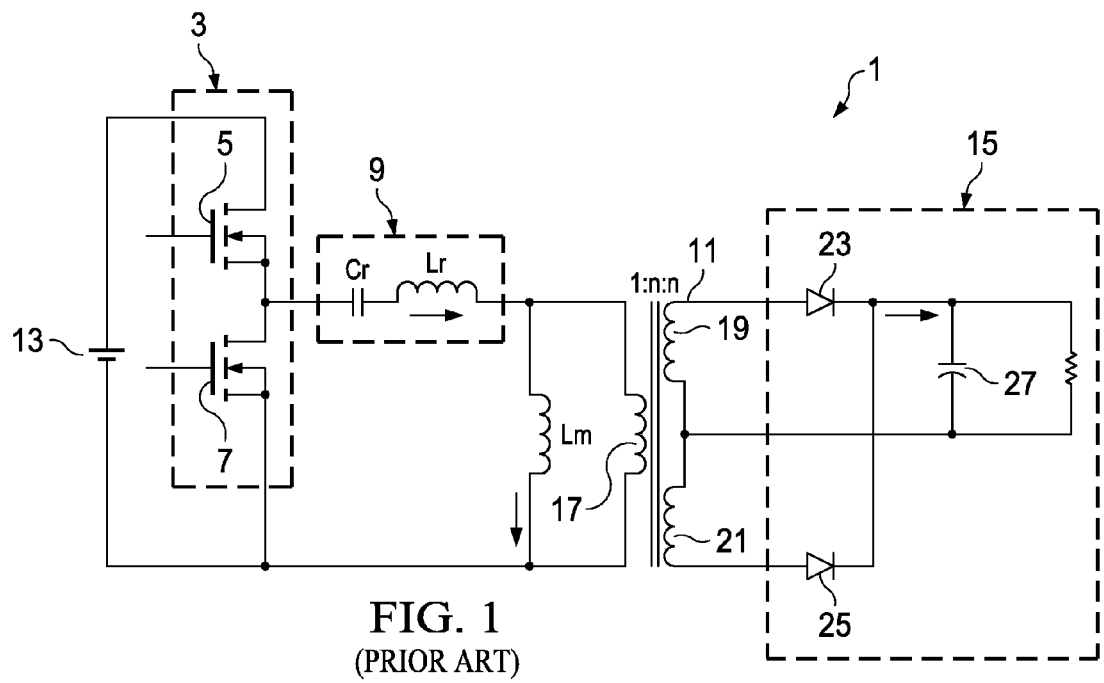
FIG. 1 a schematic diagram illustrating one example of an inductor capacitor converter according to the state of the art.
Figure 2:
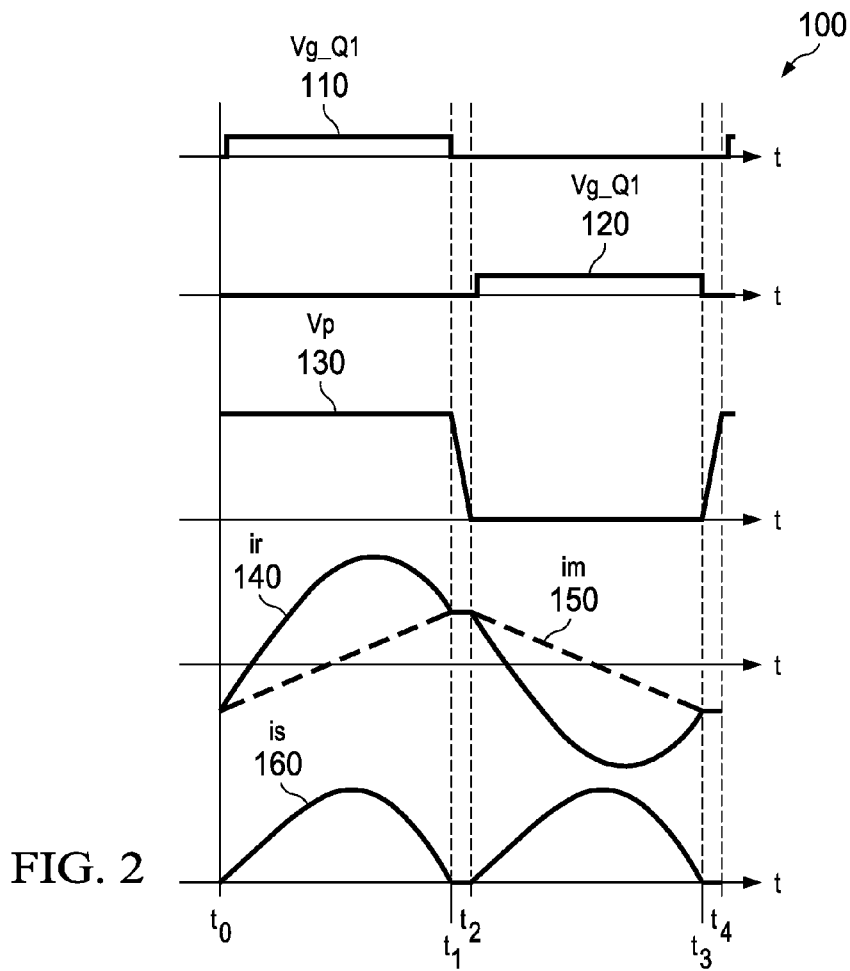
FIG. 2: a diagram illustrating the gate voltage of the power switches and the copied secondary side current measured on the primary side.

FIG. 2 shows a diagram 100 illustrating the gate voltage 110, 120 of the power switches and the copied secondary side current measured on the primary side of a LLC converter. Two power switches operate under the condition of equal pulse width, in general in the condition of 50%, minus a delay time. The voltage 130 represents the centre point of the two power switches. The current 140 measured by a current sense transformer comprises the reflected secondary side current of a transformer and the magnetizing current 150. The current 160 represents the measured current 140 from which the magnetizing current 150 has been subtracted and that is therefore proportional to the secondary side current of the transformer of the LLC converter and that can be used for regulating the output of the LLC converter.

Figure 3:
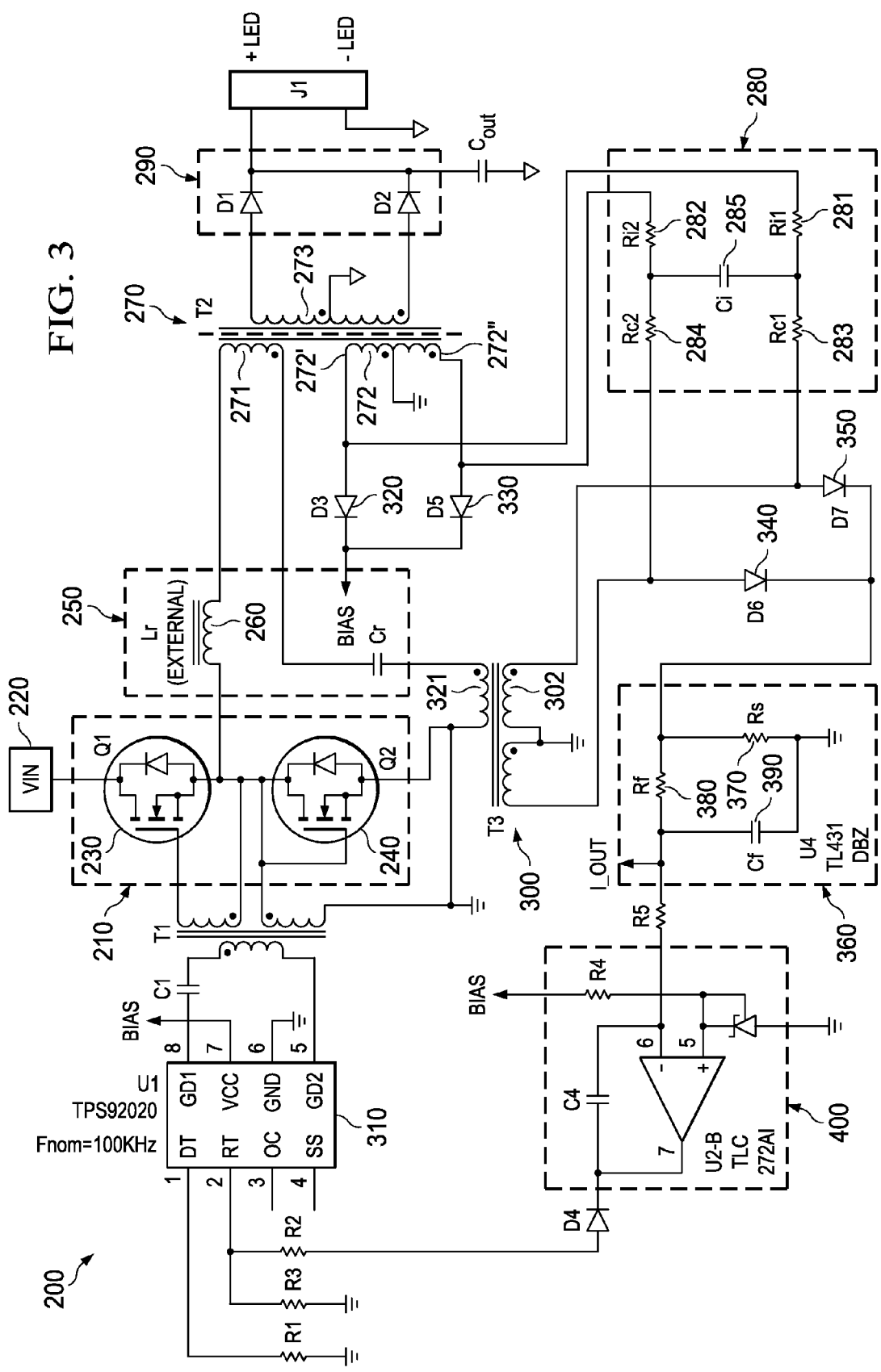
FIG. 3: a schematic diagram illustrating one example of an inductor capacitor converter according to the present disclosure.

Examples of the present disclosure may be practiced with an apparatus shown in FIG. 3. FIG. 3 shows a schematic diagram illustrating one example of an inductor capacitor converter according to the present disclosure. A LLC converter 200 comprises a bridge circuit 210 coupled to an input voltage 220. The bridge circuit 210 comprises at least one pair of power switches 230, 240. A resonant network 250 is coupled to the bridge circuit 210 and being driven by the at least one pair of power switches 230, 240. One inductor 260 is coupled between the bridge circuit 210 and a transformer 270, being part of the resonant network 250.

The transformer 270 is coupled to the resonant network 250, wherein the transformer comprises a first primary side winding 271 and an auxiliary winding 272 and at least a secondary side winding 273. A current sense transformer 300 is coupled on the primary side 321 of the current sense transformer 300 in series with the resonant network 250 and the first primary winding 271 of the transformer 270.

An integrator circuit 280 is coupled in parallel to the auxiliary winding 272 of the transformer 270 and in parallel to the secondary side winding 302 of the current sense transformer providing an integration of the voltage of the second primary side winding of the transformer. The integrator circuit 280 comprises at least four resistors 281, 282, 283, 284 and a first capacitor 285, wherein a first resistor 281 and a third resistor 283 are connected in series. The first resistor is connected to a positive terminal 272' of the auxiliary winding 272 of the transformer 270. A second resistor 282 and a fourth resistor 284 are connected in series; the second resistor 282 is connected to a negative terminal 272" of the auxiliary winding 272 of the transformer 270. A first side of the first capacitor 285 is connected between the first and the third resistor 281, 283 and a second side of the first capacitor 285 is connected between the second and the fourth resistor 282, 284 in parallel to the auxiliary winding 272 of the transformer 270. The third resistor 283 is connected to a negative terminal 301 of the secondary side winding of the current sense transformer 300 and the fourth resistor 284 is connected to a positive terminal 302 of the secondary side winding of the current sense transformer 300.

A rectification circuit 290 is coupled to the secondary side winding 273 of the transformer 270 providing the output current of the LLC series resonant converter. A frequency adjustment controller 310 is coupled between the at least one pair of power switches 230, 240 and the current sense transformer 300 and the integrator circuit 280 providing driving signals to the at least one pair power switches.

An anode of a first bias diode 320 is connected to the positive terminal 272' of the second primary winding 272 of the transformer 270 and an anode of a second bias diode 330 is connected to the negative terminal 272" of the second primary winding 272 of the transformer 270. The cathodes of the first and the second bias diode 320, 330 are connected to a first common connection point and the first common connection point is connected to a first input of the frequency adjustment controller 310.

The anode of a first current sense diode 340 is connected to the positive terminal of the secondary side winding 302 of the current sense transformer 300, and the anode of second current sense diode 350 is connected to the negative terminal of the secondary side winding 302 of the current sense transformer 300.

The cathodes of the first and the second current sense diodes 340, 350 are connected to a second common connection point. A low-pass filter 360 is connected between the second common connection point and the second input of the frequency adjustment controller 310. The low-pass filter 360 comprises a fifth resistor 370 coupled between the second connection point and ground, a sixth resistor 380 coupled between the second common connection point and a second capacitor 390. A first side of the second capacitor 390 is coupled to sixth resistance 380 and the second side of the second capacitor 390 is connected to ground. A comparator 400 is connected to the sixth resistor and to a third input of the frequency adjustment controller 310, wherein the comparator 400 is configured to compare the voltage proportional to the current on the secondary side of the frequency adjustment controller 310 with a reference voltage.

Figure 4:
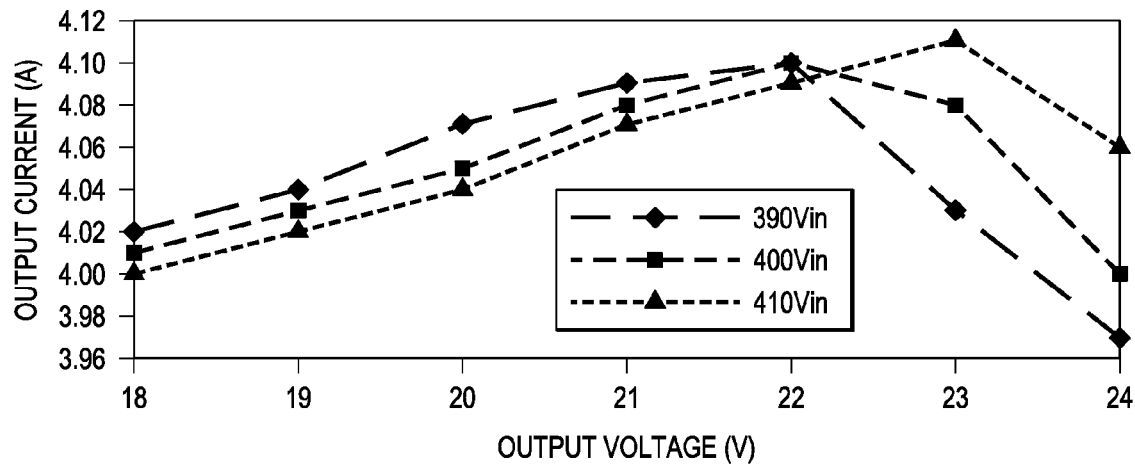
FIG. 4: a diagram illustrating the compensated output current of an inductor capacitor converter according to the present disclosure.
Figure 5:
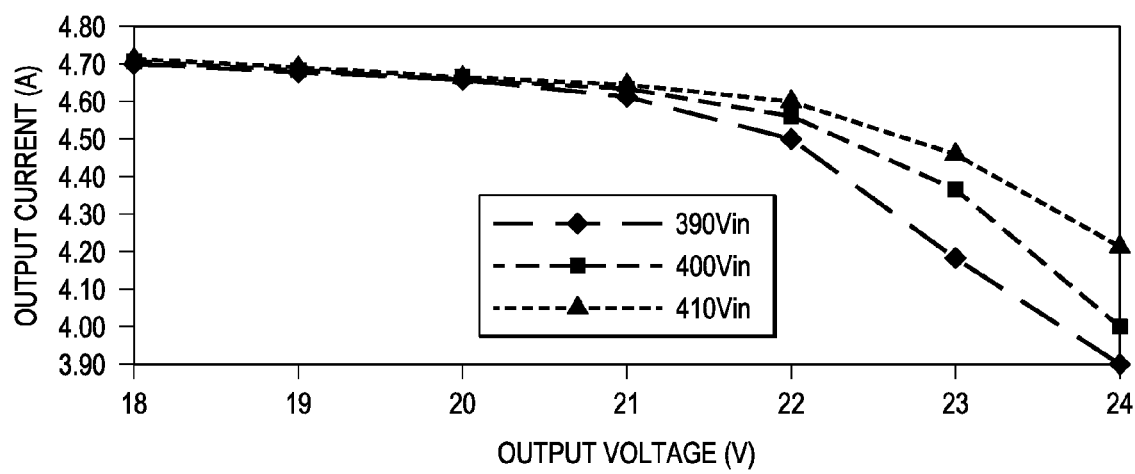
FIG. 5: a diagram illustrating the uncompensated output current of an inductor capacitor converter according to the present disclosure.
Figure 6:
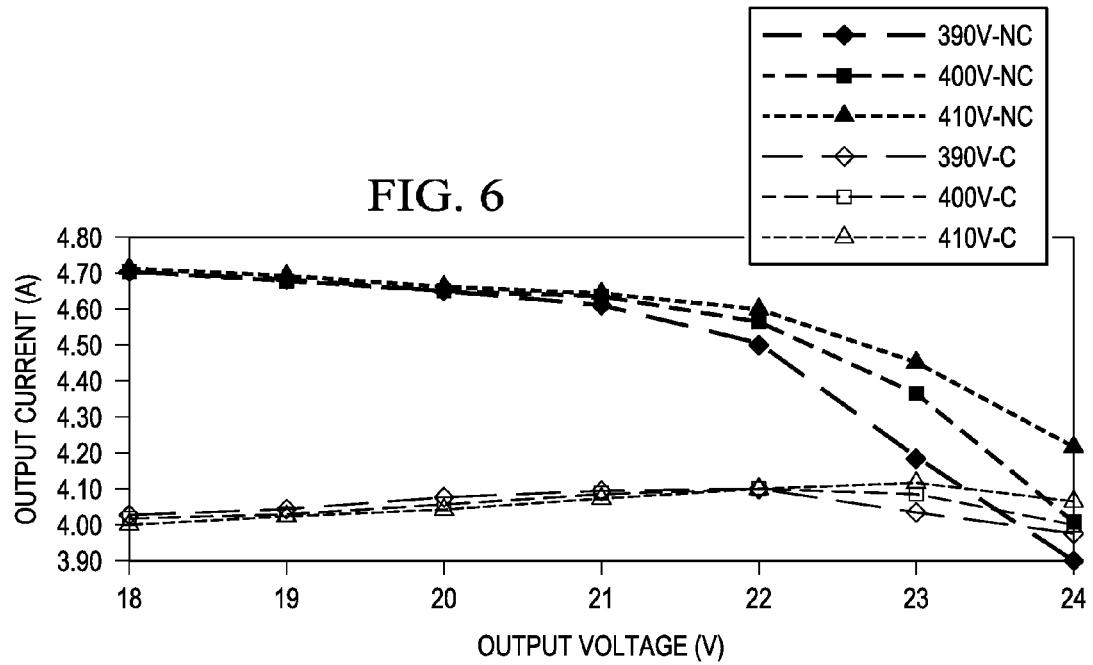
FIG. 6: a diagram illustrating a comparison of the uncompensated and the compensated output current of an inductor capacitor converter according to the present disclosure.

FIGS. 4 to 6 show diagrams illustrating the compensated and the uncompensated output current of an inductor capacitor converter according to the present disclosure. For testing an LLC converter according to the present disclosure, the input voltage has been varied between 390V and 410V. The output terminals of the LLC converter according to the present disclosure have been connected to an electronic load, wherein the electronic load is a constant voltage load to simulate a LED string. The output voltage setup has been varied between 18V and 24V. As shown in FIG. 4, the compensated output current variations in all conditions are up to +2.75% and −0.75% at the maximum. If centered to 4.04 A, the variation would be up to +/−1.73%. FIG. 5 shows an uncompensated LLC converter under the same conditions as the compensated LLC converter according to the present disclosure. The uncompensated current variations are up to +17.5% and −2.5% at the maximum. If centered to an average value, the current variations would be up to +/−9.3%. FIG. 6 shows the direct comparison of an uncompensated LLC converter and a compensated LLC converter according to the present disclosure.

Figure 7:
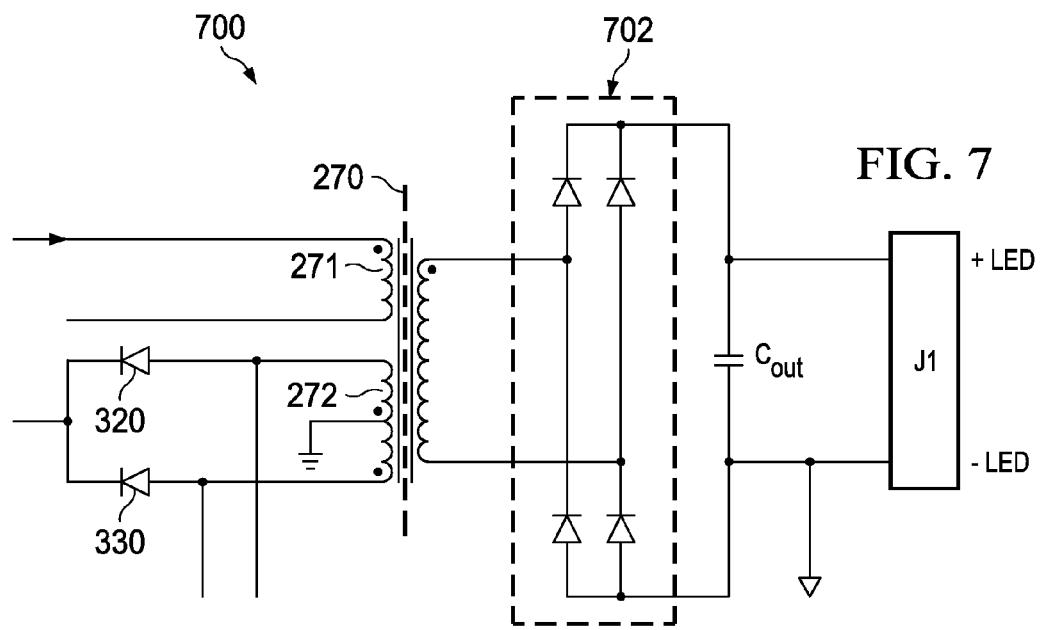
FIG. 7 a diagram of the circuit of FIG. 3 with a full wave rectifier output.

FIG. 7 shows a modification of the circuit of FIG. 3, generally as 700, in which the secondary winding of transformer 270 is not center tapped and a full wave rectification 702 is utilized instead.

Although the invention has been described in detail, it should be understood that various changes, substitutions and alterations can be made thereto without departing from the spirit and scope of the invention as defined by the appended claims.

The invention claimed is:

1. A LLC converter, comprising:
    a bridge circuit, coupled to an input voltage, comprising at least one pair of power switches;
    a resonant network, coupled to the bridge circuit and being driven by the at least one pair of power switches;
    an output transformer, coupled to the resonant network; the transformer comprising a first primary side winding, an auxiliary winding and at least a secondary side winding;
    a current sense transformer, coupled on a primary side in series to the resonant network and the first primary side winding of the output is a transformer;
    an integrator circuit coupled in parallel to a second primary side winding of the output transformer and in parallel to a secondary side winding of the current sense transformer providing an integration of a voltage of the second primary side winding of the output transformer;
    a rectification circuit, coupled to the secondary side winding of the output transformer, the transformer providing an output current of an LLC series resonant converter,
    a frequency adjustment controller, coupled between the at least one pair of power switches and the current sense transformer and the integrator circuit providing driving signals to the at least one pair power switches.

2. The LLC converter according to claim 1, further comprising:
    the integrator circuit comprising at least four resistors and a first capacitor, wherein a first resistor and a third resistor are connected in series, the first resistor is connected to a positive terminal of the second primary side winding of the transformer;
    a second resistor and a fourth resistor are connected in series, the second resistor is connected to a negative terminal of the second primary side winding of the transformer;
    a first side of the first capacitor is connected between the first and the third resistor and a second side of the first capacitor is connected between the second and the fourth resistor in parallel to the second primary side winding of the transformer, and wherein
    the third resistor is connected to a negative terminal of the secondary side winding of the current sense transformer and the fourth resistor is connected to a positive terminal of the secondary side winding of the current sense transformer.

3. The LLC converter according to claim 1, wherein a first or a second power switch is a metal-oxide-semiconductor field-effect transistor (MOSFET).

4. The LLC converter according to claim 1, wherein the rectification circuit comprises at least two rectification diodes.

5. The LLC converter according to claim 4, wherein cathodes of at least two rectification diodes are connected to one terminal of an output capacitor and another terminal of the output capacitor is connected to ground,
    anodes of a first and a second rectification diodes are connected to ground and the cathode of the first rectification diode is connected to a positive terminal of the secondary winding of the transformer and the cathode of the second rectification diode is connected to a negative terminal of the secondary winding of the transformer, and the anode of a third rectification diode is connected to the positive terminal of the secondary winding of the transformer and the anode of a fourth rectification diode is connected to the negative terminal of the secondary winding of the transformer, and the cathodes of the third and fourth second rectification diode are connected to one terminal of an output capacitor and another terminal of the output capacitor is coupled to ground.

6. The LLC converter according to claim 4, wherein the anode of the first rectification diode is connected to the positive terminal of the secondary side winding of the output transformer, and the anode of second rectification diode is connected to the negative terminal of the secondary side winding of the output transformer.

7. The LLC converter according to claim 1, wherein at least one inductor is coupled between the bridge circuit and the output transformer.

8. The LLC converter according to claim 7, wherein an anode of a first bias diode is connected to the positive terminal of the second primary winding of the output transformer and an anode of a second bias diode is connected to the negative terminal of the second primary winding of the output transformer and the cathodes of the first and the second bias diode are connected to a first common connection point.

9. The LLC converter according to claim 8, wherein the first common connection point is connected to a first input of the frequency adjustment controller.

10. The LLC converter according to claim 1, wherein the frequency adjustment controller is an analog controller.

11. The LLC converter according to claim 1, wherein an anode of a first current sense diode is connected to the positive terminal of the secondary side winding of the current sense transformer, and an anode of second current sense diode is connected to the negative terminal of the secondary side winding of the current sense transformer.

12. The LLC converter according to claim 11, wherein cathodes of the first and the second current sense diodes are connected to a second common connection point.

13. The LLC converter according to claim 12, wherein a resistor is connected between the second common connection point and the second input of the frequency adjustment controller.

14. The LLC converter according to claim 13, wherein a low-pass filter is connected between the second common connection point and the second input of the frequency adjustment controller.

15. The LLC converter according to claim 14, wherein the low-pass filter comprises a fifth resistor coupled between the second connection point and ground, a sixth resistor coupled between the second common connection point and the second input of the frequency adjustment controller and a second capacitor, a first side of the second capacitor is coupled between the second input of the frequency adjustment controller and sixth resistor and the second side of the second capacitor is connected to ground.

16. The LLC converter according to claim 15, wherein a comparator is coupled to the sixth resistor and to a third input of the frequency adjustment controller, wherein the comparator is configured to compare the voltage proportional to the current on the secondary side of the frequency adjustment controller with a reference voltage.

17. A LLC converter, comprising:
a bridge circuit, coupled to an input voltage, comprising at least one pair of power switches;
a resonant network, coupled to the bridge circuit and being driven by the at least one pair of power switches;
an output transformer, coupled to the resonant network; the transformer comprising a first and a second primary side winding and at least a secondary side winding;
a current sense transformer, coupled on a primary side in series to the resonant network and the first primary winding of the output transformer;
an integrator circuit coupled in parallel to a second primary side winding of the output transformer and in parallel to a secondary side winding of the current sense transformer providing an integration of the voltage of the second primary side winding of the transformer;
a rectification circuit, coupled to the secondary side winding of the output transformer, the output transformer providing an output current of the LLC series resonant converter,
a frequency adjustment controller, coupled to at least one pair of power switches and the current sense transformer and the integrator circuit providing driving signals to the at least one pair power switches, and
at least one inductor is coupled between the bridge circuit and the output transformer, and an anode of a first bias diode is connected to a positive terminal of the second primary winding of the transformer and an anode of a second bias diode is connected to a negative terminal of the second primary winding of the transformer and the cathodes of the first and the second bias diodes are connected to a first common connection point, and wherein the first common connection point is connected to a first input of the frequency adjustment controller; and wherein the anode of a first current sense diode is connected to the positive terminal of the secondary side winding of the current sense transformer, and the anode of a second current sense diode is connected to the negative terminal of the secondary side winding of the current sense transformer;

the integrator circuit comprising at least four resistors and a first capacitor, wherein a first resistor and a third resistor are connected in series, the first resistor is connected to a positive terminal of the second primary side winding of the transformer;

a second resistor and a fourth resistor are connected in series, the second resistor is connected to a negative terminal of the second primary side winding of the transformer;

a first side of the first capacitor is connected between the first and the third resistor and a second side of the first capacitor is connected between the second and the fourth resistor in parallel to the second primary side winding of the transformer, and wherein the third resistor is connected to a negative terminal of the secondary side winding of the current sense transformer and the fourth resistor is connected to a positive terminal of the secondary side winding of the current sense transformer and wherein the cathodes of the first and the second current sense diodes are connected to a second common connection point and the second common connection point is coupled to a second input of the frequency adjustment controller; and wherein a low-pass filter is connected between the second common connection point and the second input of the frequency adjustment controller.

* * * * *